United States Patent [19]
Nishigai

[11] Patent Number: 5,661,552
[45] Date of Patent: Aug. 26, 1997

[54] FORGERY-PREVENTING DOCUMENT READING DEVICE BASED ON MICROWAVE REFLECTION

[75] Inventor: Hidefumi Nishigai, Ebina, Japan

[73] Assignee: Fuji Xerox Co., Ltd., Tokyo, Japan

[21] Appl. No.: 543,912

[22] Filed: Oct. 17, 1995

[30] Foreign Application Priority Data

Nov. 10, 1994 [JP] Japan .................. 6-276531

[51] Int. Cl.⁶ .................................. G06K 9/62
[52] U.S. Cl. .............. 356/71; 250/556; 324/637
[58] Field of Search .................. 356/71, 218, 444, 356/448; 250/556; 355/201

[56] References Cited

U.S. PATENT DOCUMENTS

| | | | |
|---|---|---|---|
| 4,586,811 | 5/1986 | Kubo et al. | 355/201 |
| 4,681,455 | 7/1987 | Jeschke et al. | 356/448 |
| 4,723,149 | 2/1988 | Harada | 355/201 |
| 5,279,403 | 1/1994 | Harbaugh et al. | 194/207 |
| 5,481,334 | 1/1996 | Arimoto et al. | 250/556 |
| 5,495,329 | 2/1996 | Anderson et al. | 356/218 |

FOREIGN PATENT DOCUMENTS

| | | |
|---|---|---|
| 63-501250 | 5/1988 | Japan . |
| 6-87288 | 3/1994 | Japan . |
| 6-79991 | 3/1994 | Japan . |

*Primary Examiner*—Richard A. Rosenberger
*Attorney, Agent, or Firm*—Oliff & Berridge

[57] ABSTRACT

Metal fibers are mixed, at a predetermined mixing ratio, into a document for which forgery should be prevented. In reading a document, microwaves are applied to the document via a transmission antenna and reflected microwaves are received via a reception antenna. The document includes a portion in which the microwave reception level falls within a predetermined range and which portion is longer than a predetermined length, the document is regarded as a forgery preventive document and the copying operation is stopped. Further, a registration guide is so formed as to reflect microwaves at a certain reflectance. Influences of variations due to a temperature change and aging are compensated by measuring a reception level corresponding to the registration guide.

12 Claims, 4 Drawing Sheets

FORGERY-PREVENTING DOCUMENT READING DEVICE BASED ON MICROWAVE REFLECTION

BACKGROUND OF THE INVENTION

1. Field of the Invention

The present invention relates to a document reading device suitable for the purpose of preventing forgery of paper money (bills), marketable securities, etc., and to an image forming apparatus having such a document reading device.

2. Description of the Related Art

With recent improvements in performance of color copiers, color printers, and the like, the possibility that paper money, marketable securities, gift certificates, admission tickets for entertainments, etc. are forged has increased. A technique for preventing such forgery is known in which image patterns of paper money etc. are previously stored in a memory, image data of a document is compared with the contents of the memory, and when they are close to each other, a normal image output operation is not performed (for example, the corresponding portion is printed black). Another technique is known which causes a printed image to contain a dot pattern that represents the production number or the like of a copier used but cannot be recognized by the naked eye, to thereby facilitate tracing of a forger.

However, it is difficult for the former technique to cope with all the documents of which forgery should be prevented. Namely, although the kinds of paper money circulated are limited, there are enormous kinds of marketable securities, admission tickets, and the like. It is not realistic to store image patterns of all of such items. Further, although the latter technique facilitates tracing of forgery after it is done, that technique cannot prevent the forgery itself.

On the other hand, a technique is known in which the genuineness of a bill, for instance, is judged based on metal fibers that are contained in it in a predetermined distribution pattern (Japanese Unexamined Patent Publication Nos. Sho. 63-501250, Hei. 6-87288, and Hei. 6-79991). According to this technique, a slit is formed so as to cross a waveguide which propagates microwaves. A bill, for instance, is inserted into the slit while the microwave transmittance is measured. If the bill is genuine, the transmittance should vary in accordance with the above-mentioned distribution pattern of metal fibers. Therefore, the genuineness of the bill is judged based on whether such a variation is obtained.

Although various kinds of paper money etc. have different distribution patterns of the metal fibers, they have a common feature that they reflect microwaves at at least a certain level of reflectance. Therefore, a document reading device used in a copier or the like may be so constructed that microwaves are applied to a document, and the document is read only when it does not reflect the microwaves. However, this configuration has various problems described below.

First, since the document reading device uses an exposure lamp or the like, it is likely subject to a temperature variation. Therefore, the output level of a microwave transmitter/receiver circuit largely varies through its temperature characteristics, the size of a microwave transmission line largely varies due to thermal expansion, and an output variation due to aging is also large. As a result, there may occur a case that the microwave transmitter/receiver circuit does not produce a normal output. This will cause various problems such as the forgery preventing function not being effected, or being effected for a general document. Further, a user may not repair the document reading device in spite of a failure of the forgery preventing function. Or he may intentionally makes the forgery preventing function inoperative and misuses the document reading device. For example, he may covers a microwave transmitter section with a metal plate.

SUMMARY OF THE INVENTION

The present invention has been made in view of the above circumstances, and has an object of providing a document reading device which can effectively prevent forgery of paper money etc., and an image forming apparatus having such a document reading device.

To attain the above object, according to the invention, there is provided a document reading device comprising:

a platen glass on which a document is to be placed;

scanning mean that moves along the platen glass;

electromagnetic wave generating means provided in the scanning means, for radiating electromagnetic waves;

a reflective member provided in an electromagnetic wave radiation range of the electromagnetic wave generating means, for reflecting part of the electromagnetic waves at a predetermined reflectance; and electromagnetic wave receiving means provided in the scanning means, for receiving part of the electromagnetic waves reflected by the document or the reflective member.

With this constitution, as the scanning means moves along the platen glass, the electromagnetic wave generating means radiates electromagnetic waves. Where electromagnetic waves are incident on the reflective member, after being reflected by the reflective member, the electromagnetic waves are received by the electromagnetic wave receiving means. Since the reflective member has a predetermined reflectance, variation states of the characteristics of the electromagnetic wave generating means, the electromagnetic wave receiving means, etc. can be obtained based on the electromagnetic wave reception level.

On the other hand, where electromagnetic waves are incident on the document, after being reflected by the document, the electromagnetic waves are received by the electromagnetic wave receiving means. The reception level in the electromagnetic wave receiving means corresponds to the reflectance of the document. Therefore, if the reflectances of forgery preventive documents are set within a prescribed range, it can be judged whether the document is a forgery preventive document.

According to another aspect of the invention, there is provided an image forming apparatus comprising the above document reading device, and processing means for performing a forgery preventive action when a reception level of the part of the electromagnetic waves reflected by the document and received by the electromagnetic wave receiving means falls within a range that is set based on a reflectance of a forgery preventive document.

DESCRIPTION OF THE PREFERRED EMBODIMENTS

First, a description will be made of the constitution of a document reading device according to an embodiment of the present invention. This document reading device is one used in a color copier.

Figure 1:
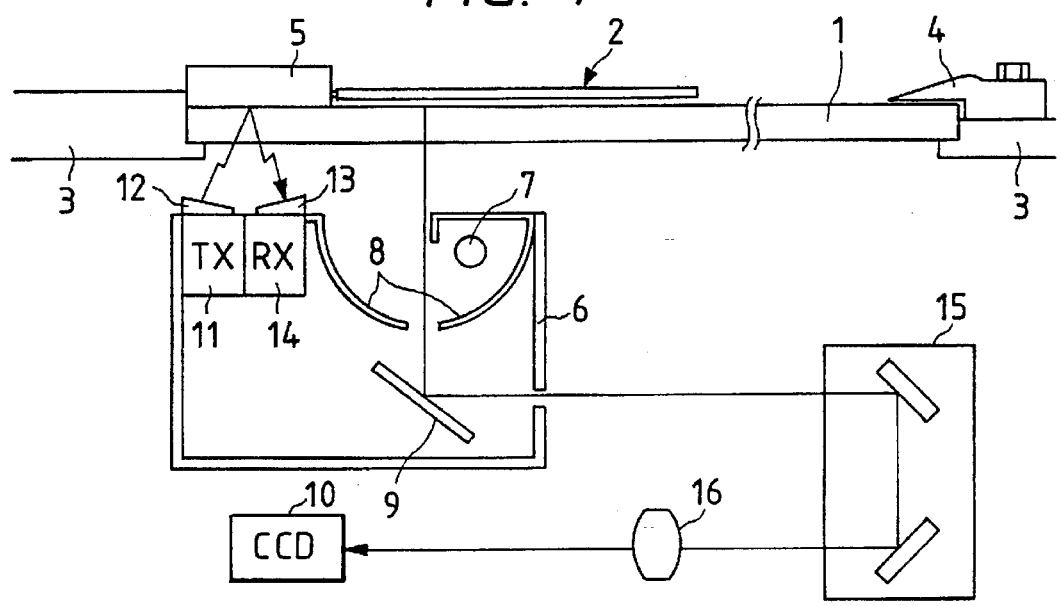
FIG. 1 schematically shows the configuration of a document reading device according to an embodiment of the present invention.

Referring to FIG. 1, a platen glass 1 is placed on a glass frame 3 at a predetermined position. Reference numeral 4 denotes a glass presser for fixing t he platen glass 1 to the glass frame 3. Reference numeral 5 represents a registration guide, on the top surface of which markers are printed that indicate positions where a document 2 should be placed in accordance with its size (A4, B4, or the like). A lamp carriage 6 is so provided as to be movable parallel with the platen glass 1. A lamp 7, which is provided in the lamp carriage 6, illuminates the document 2 via reflectors 8.

The light emitted from the lamp 7 is reflected by the document 2 and reaches a CCD line sensor 10 via a full-rate mirror 9, a half-rate mirror 15, and a lens 16. A transmitter section 11 outputs microwaves of a prescribed level, which are radiated from a transmission antenna 12 toward the platen glass 1. A receiver section 14 detects microwaves that have been received by the reception antenna 13, and outputs a resulting detection signal $S_1$. Thus, the detection signal $S_1$ has a level that is proportional to the RF level of the received microwaves. The transmission antenna 12 and the reception antenna 13 are so arranged that the reception level (i,e., the detection signal $S_1$) is maximum when microwaves are reflected by the top surface of the platen glass 1.

Figure 4:
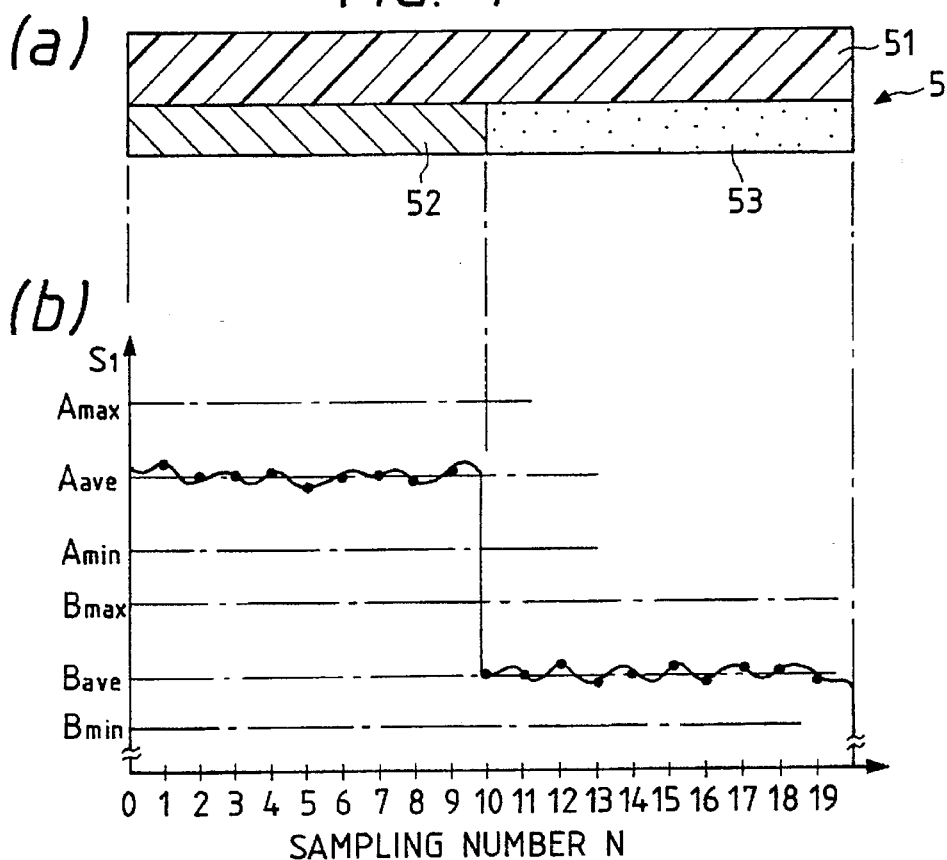
FIG. 4 shows the structure of a registration guide and a waveform of a microwave detection signal.

Part (a) of FIG. 4 shows a cross-sectional view of the registration guide 5. In this figure, reference numeral 51 denotes a synthetic resin plate having a flat plate shape. As described above, the markers are printed on the top surface of the synthetic resin plate 5 which markers indicate the positions where documents of the respective sizes are to be placed. A flat conductor plate 52 made of copper, for instance, has a width that is ½ of the width of the synthetic resin plate 51 and bonded to the bottom surface of the synthetic resin plate 51. Further, a metal-fiber-mixed resin plate 53 is a plate that is formed by mixing metal fibers into a resin at a predetermined ratio and shaping a mixture into a flat plate. The metal-fiber-mixed resin plate 53 has a width that is ½ of the width of the synthetic resin plate 51 and is bonded to the bottom surface of the synthetic resin plate 51 so as to adjoin the conductor plate 52. The mixing ratio of metal fibers may be so set as to provide a reflectance (e.g., 50%) similar to reflectances of various kinds of forgery preventive documents.

The electrical constitution of the above document reading device will now be described with reference to FIG. 2.

Figure 2:
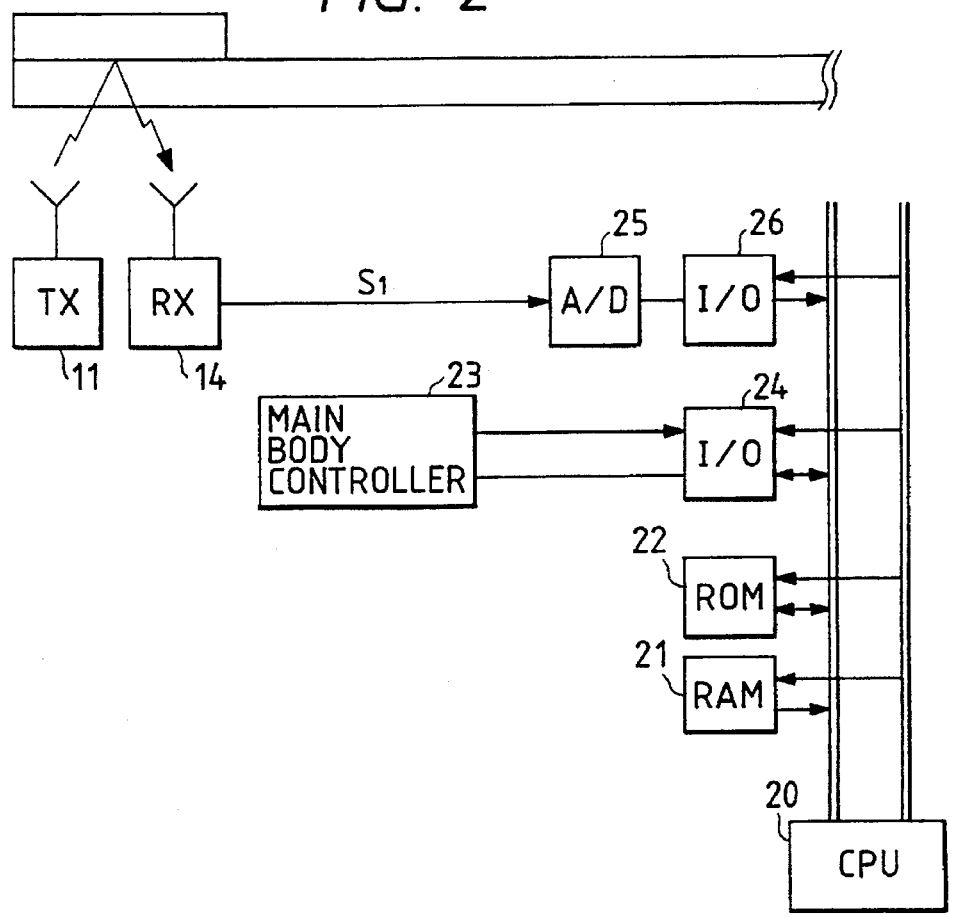
FIG. 2 is a block diagram showing the electrical configuration of the document reading device of FIG. 1.

In FIG. 2, a CPU 20 controls other components of the document reading device based a control program stored in a ROM 22. Reference numeral 21 denotes a RAM to and from which data can be written and read freely by the CPU 20. An A/D converter 25 converts the detection signal $S_1$ to a digital signal, which is supplied to the CPU 20 through an I/O controller 26. A main body controller 23 controls the whole copier. An I/O controller 24 relays various signals between the main body controller 23 and the CPU 20.

The operation of this embodiment will be hereinafter described.

Figure 3:
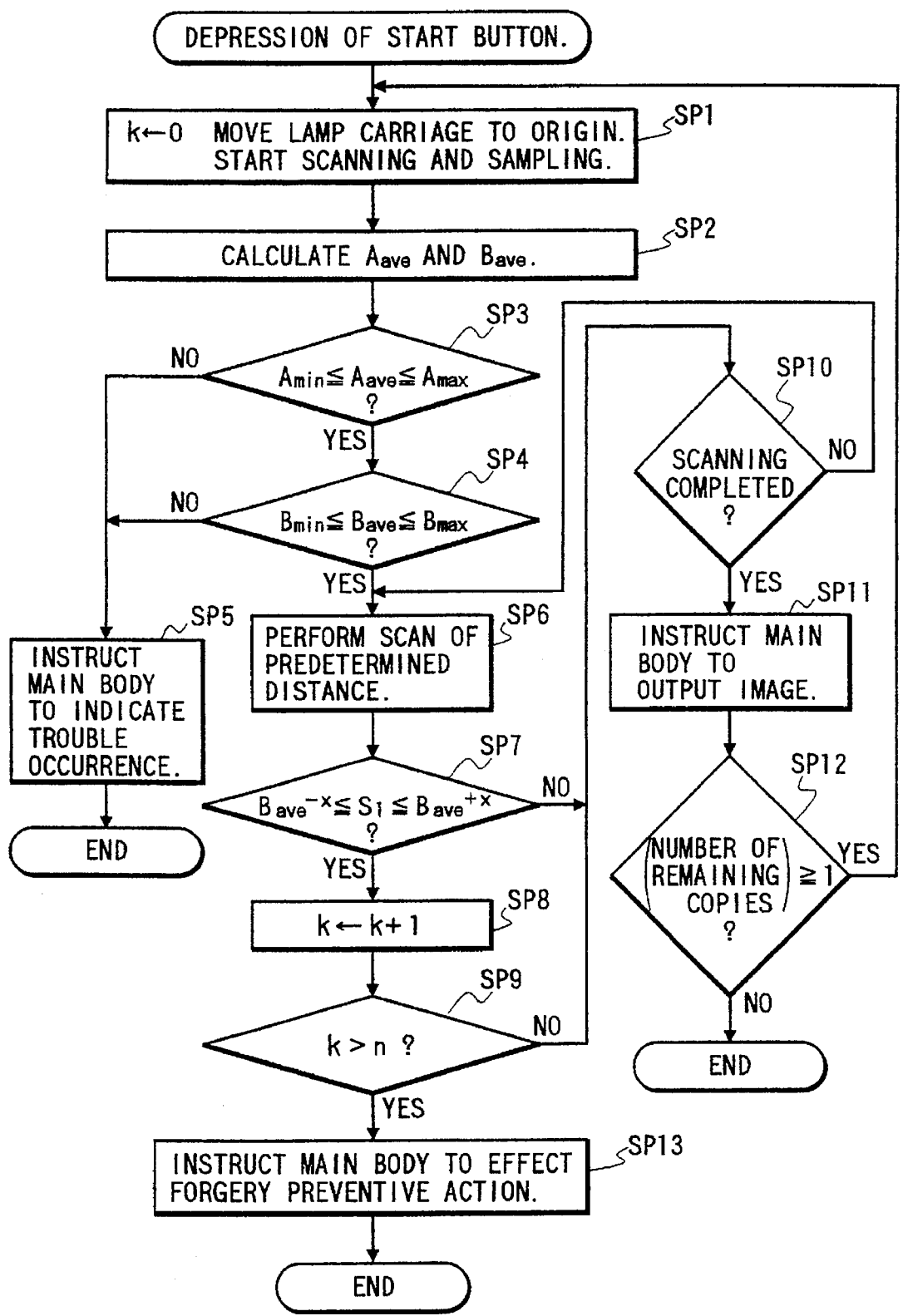
FIG. 3 is a flowchart of a control program of the document reading device of FIG. 1.

First, when a start button of the copier main body is depressed, a document reading command is sent from the main body controller 23 to the CPU 20. Upon reception of this command, the CPU 20 starts a program shown in FIG. 3. Referring to FIG. 3, when the process is started, "0" is substituted into a variable k at step SP1. The lamp carriage 6 is then moved to the origin (where the full-rate mirror 9 is Just under the registration guide 5). Then, the lamp 7 is turned on, microwaves are generated by the transmitter section 11 and transmitted from the transmission antenna 12, and the lamp carriage 6 is driven so as to move at a constant speed along the platen glass 1.

The light emitted from the lamp 7 is reflected by the reflectors 8, the registration guide 5, and the full-rate mirror 9, and input to the CCD line sensor 10. The CCD line sensor 10, outputs image data in accordance with the received light. On the other hand, the receiver section 14 detects received microwaves to output a detection signal $S_1$. The detection signal $S_1$ of the microwaves reflected by the registration guide 5 has a waveform as shown in part (b) of FIG. 4. More specifically, having a high reflectance, the conductor plate 52 causes the detection signal $S_1$ having a high level. On the other hand, having a somewhat low reflectance, the metal-fiber-mixed resin plate 53 causes the detection signal $S_1$ having a low level.

The detection signal $S_1$ is sampled by the CPU 20 at a sampling period that is obtained by equally dividing the time interval shown in part (b) of FIG. 4 into 20 portions. Sampling results are sequentially stored into the RAM 21. The order of sampling results is represented by "sampling numbers." When a total of 19 sampling points are obtained, the process proceeds to step SP2. At step SP2, an average $A_{ave}$ of the sampling results of sampling numbers N=1–9 and an average $B_{ave}$ of the sampling results of sampling numbers N=11–19 are calculated. The sampling result of sampling number N=10 is not used, because it corresponds to the border portion between the conductor plate 52 and the metal-fiber-mixed resin plate 53.

At step SP3, it is judged whether the average $A_{ave}$ falls within a range defined by a predetermined minimum value $A_{min}$ and a predetermined maximum value $A_{max}$. The minimum value $A_{min}$ and the maximum value $A_{max}$ are preset values close to the limits of variations of the detection signal $S_1$ due to a temperature variation and aging under the normal condition. If the judgment result at step SP3 is NO, the process proceeds to step SP5. At step SP5, CPU 20 sends to the main body controller 23 a command to make a predetermined trouble indication, and the document reading process is forced to finish.

When the process proceeds to the SP4, it is judged whether the average $B_{ave}$ falls within a range defined by a predetermined minimum value $B_{min}$ and a predetermined maximum value $B_{max}$. As in the case of $A_{min}$ and $A_{max}$, the minimum value $B_{min}$ and the maximum value $B_{max}$ are preset values close to the limits of variations of the detection signal $S_1$ under the normal condition. If the judgment result at step SP4 is NO, the process proceeds to step SP5.

On the other hand, if the judgment results at both steps SP3 and SP4 are YES, the process proceeds to step SP6, where the lamp carriage 6 is moved by a predetermined distance (for example, about several millimeters). Even during this movement, the document 2 is read by the CCD line sensor 10 and microwaves reflected by the document 2 are received by the receiver section 14. In this operation, the level of the detection signal $S_1$ is stored in the RAM 21. At step SP7, it is judged whether the level of the detection signal $S_1$ stored in the RAM 21 falls within a range of $B_{ave}\pm x$. The value x may be set at such a value (voltage or current) that the range $B_{ave}\pm x$ includes microwave reflectances (for instance, 50%) of various forgery preventive documents.

Where the document is mere paper, the level of the detection signal $S_1$ should be smaller than $B_{ave}-x$. Where the document 2 is a metal product, or where it is a product a large part of which is made of metal and microwaves are reflected by a metal portion, the level of the detection signal $S_1$ should exceed $B_{ave}+x$. Therefore, in either case, the judgment result at step SP7 is NO and the process proceeds to step SP10. At step SP10, it is judged whether the scanning of the document 2 has been completed, that is, whether the lamp carriage 6 has moved by a predetermined distance (which is determined according to the document size) from the origin.

If the judgment result at step SP6 is NO, the process returns to step SP6. Subsequently, the loop of steps SP6, SP7 and SP10 are repeated while the lamp carriage 6 is moved by several millimeters in each repetition. Output signals of the CCD line sensor 10 are stored into an image memory (not shown) provided in the copier main body. When the scanning of the document 2 is completed, the judgment result at step SP10 turns YES and the process proceeds to step SP11. At step SP11, the CPU 20 sends the main body controller 23 a command to effect image output. When receiving this command, the main body controller 23 prints out the image data stored in the image memory on a sheet.

when the process proceeds to step SP12, it is judged whether the number of remaining copies (difference between a desired number of copies and the number of copies already made) is "1" or more. If the judgment result at step SP12 is YES, the process returns to step SP1 to repeat the above-mentioned operations a number of times corresponding to the desired number of copies. When the number of remaining copies becomes "0," the judgment result at step SP12 turns YES and the process finishes normally. While the series of operations is repeated in the above manner, the judgments relating to the forgery prevention (step SP7 etc.) are also performed every time one copy is produced. This is because if such judgments are omitted in producing the second and subsequent copies, it becomes possible to copy a forgery preventive document by substituting it for the current document 2 in the midst of copying the latter.

Next, a description will be made of operations that are performed where the document 2 is a forgery preventive document. First, if the level of the detection signal $S_1$ is within $B_{ave}\pm x$, the judgment result at step SP7 is YES and the process proceeds to step SP8. At step SP8, the variable k (which is initially-set at "0" at step SP1) is incremented by 1. At step SP9, it is judged whether the variable k is larger than a predetermined value n. If the judgment result at step SP9 is NO, the process proceeds to step SP10, repeat the scanning (step SP6) of the document 2 in the same manner as in the case of a normal document.

Thereafter, when the variable k exceeds the predetermined value n, the judgment result at step ST9 becomes YES and the process proceeds to step SP13. At step SP13, the CPU 20 sends the main body controller 23 a command to effect a forgery preventive action. The forgery preventive action may be any of the following and other actions: flashing image memory to output a white sheet, printing the whole sheet black, and not outputting a sheet. That is, any action may be taken is long as it does not provide a user with a normal copy. The reason why the forgery preventive action is effected only when the variable k exceeds the predetermined value n is to avoid a case that the forgery preventive action is effected due to dust stuck to the document 2, noise temporarily superimposed on the detection signal $S_1$, or some other cause. Thus, the predetermined value n may be set at such a value as allows detection of small-size marketable securities (e.g., postage stamps).

Figure 5:
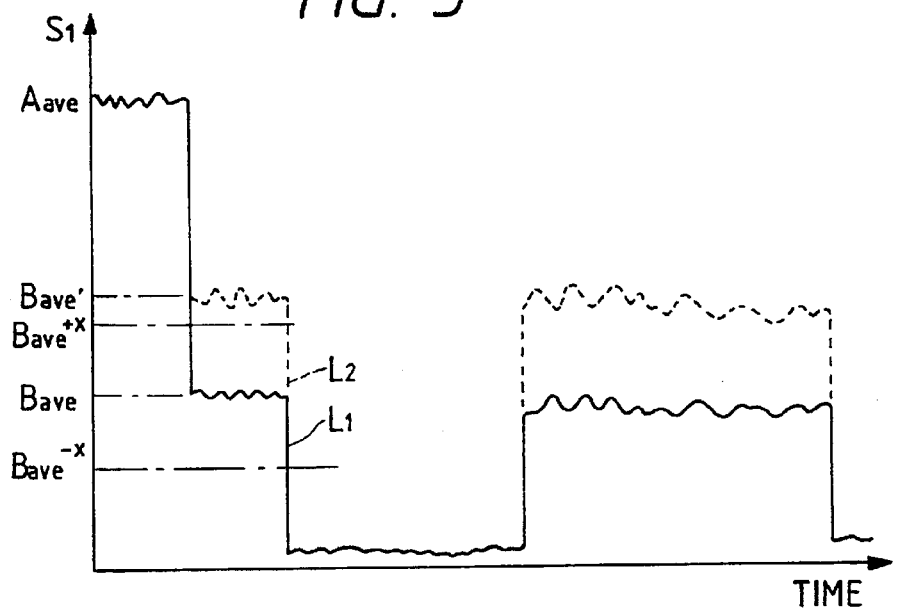
FIG. 5 shows waveforms of the microwave detection signal.

By the why, when the copier is used for a certain length of time, the internal temperature thereof gradually increases, which affects the detection signal $S_1$. For example, the detection signal $S_1$, which assumes a waveform $L_1$ (see FIG. 5) immediately after lower-on of the copier, may thereafter change to a waveform $L_2$ for the same document 2. Even in such a case, step SP2 is performed for each image input. That is, the averages $A_{ave}$ and $B_{ave}$ are calculated every time in accordance with the waveform at that time. For example, when the waveform $L_2$ shown in FIG. 5 is obtained, the average $B_{ave}$ is updated to a new average $B_{ave}$. This enables reliable judgment of a forgery preventive document even at the occurrence of a variation due to a temperature change or aging.

The present invention is not limited to the above-described embodiment, but various modifications are possible as described below.

Figure 6A:
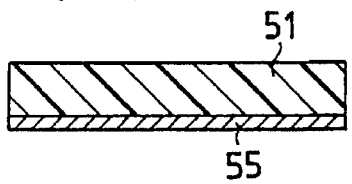
FIGS. 6A–6G illustrate modifications of the embodiment of FIG. 1.
Figure 6B:
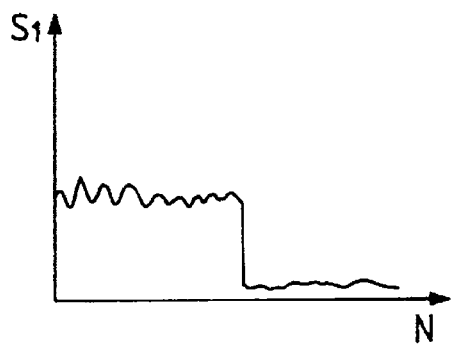

(1) The registration guide 5 may be modified as shown in FIG. 6A. In FIG. 6A, a metal-fiber-mixed resin plate 55 is bonded to the entire bottom surface of the synthetic resin plate 51. In such case, the detection signal $S_1$ assumes a waveform as shown in FIG. 6B. Further, if the metal-fiber-mixed resin plate 55 is totally replaced by a conductor plate, the detection signal $S_1$ assumes a waveform as shown in FIG. 6C.

Figure 6D:
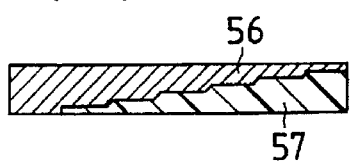
Figure 6C:
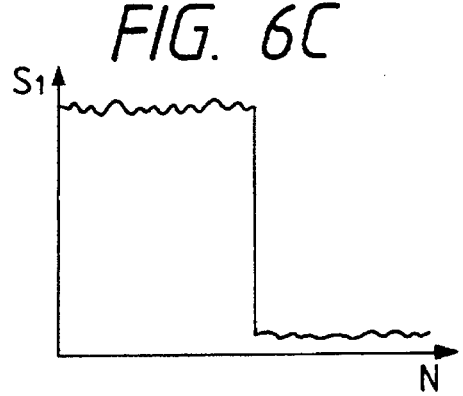

(2) The registration guide 5 may be modified as shown in FIG. 6D. In FIG. 6D, the bottom portion of the conductor plate 56 is cut in a step-like manner, and a synthetic resin plate 57 is bonded to the conductor plate 56 so as to fill up the cutout portion. In this case, when microwaves are reflected by the bottom surface of a thicker portion of the conductor plate 56, the reception level (i.e., the detection signal $S_1$) is higher because of a shorter microwave propagation path. On the other hand, when microwaves are reflected by the bottom surface of a thinner portion of the conductor plate 56, the reception level is lower because of a longer microwave propagation path. Therefore, the detection signal $S_1$ assumes a step-like waveform as shown in FIG. 6E.

Figure 6F:
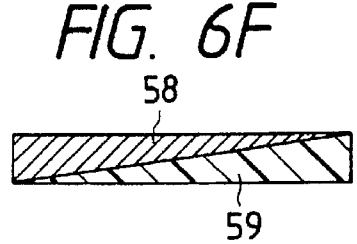
Figure 6E:
Figure 6G:
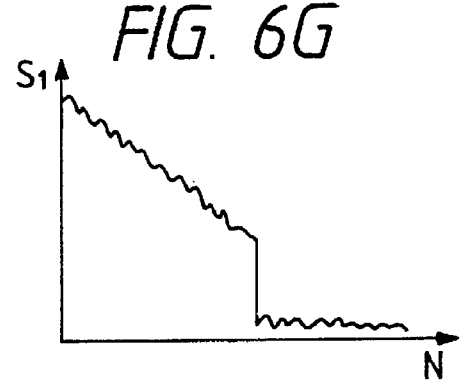

(3) Similarly, the registration guide 5 may be modified as shown in FIG. 6F. In FIG. 6F, a conductor plate 58 is formed so that its cross-section assumes an isosceles triangle, and a synthetic resin plate 59 is also formed so that its cross-section assumes an isosceles triangle symmetrical to the cross section of the conductor plate 58. The conductor plate 58 and the synthetic resin plate 59 are bonded together, to constitute a registration guide. Also in this case, microwaves reflected by a thicker portion of the conductor plate 58 reaches the reception antenna 13 at a higher level, and microwaves reflected by a thinner portion causes a lower reception level. Thus, the detection signal $S_1$ assumes a waveform as shown in FIG. 6G.

(4) In the above-described embodiment, the conductor plate 52 and the metal-fiber-mixed resin plate 53 are provided beneath the bottom surface of the registration guide 5. However, they may be provided at any position which allows them to be scanned with microwaves. Further, the microwave is used as an example of the electromagnetic wave in the above-described embodiment. However, of course, the electromagnetic wave is not limited to the microwave.

As described above, according to the invention, variation states of various characteristics of the document reading device can be obtained based on the reception level of electromagnetic waves reflected by the reflective member, and the reflectance of the document can be obtained based on the reception level of electromagnetic wave reflected by the document. Therefore, not only a failure of the document reading device can be detected easily, but also judgment of a forgery preventive document can be performed correctly while influences of variations due to a temperature change and aging are avoided. Further, according to another aspect of the invention, when the reception level of electromagnetic waves reflected by a document falls within the predetermined range, the processing means performs the predetermined forgery preventive action, thus preventing forgery.

What is claimed is:

1. A document reading device comprising:

a platen glass on which a document is to be placed;

scanning means that moves along the platen glass;

electromagnetic wave generating means provided in the scanning means, for radiating electromagnetic waves;

a reflective member, having a plurality of regions, provided in an electromagnetic wave radiation range of the electromagnetic wave generating means, each of the regions reflecting part of the electromagnetic waves at a predetermined reflectance, the predetermined reflectance of at least one of the regions being substantially equal to that of a forgery-preventive document; and electromagnetic wave receiving means provided in the scanning means, for receiving part of the electromagnetic waves reflected by the document or the reflective member.

2. An image forming apparatus comprising:

a document reading device comprising:

a platen glass on which a document is to be placed;

scanning means that moves along the platen glass;

electromagnetic wave generating means provided in the scanning means, for radiating electromagnetic waves;

a reflective member, having a plurality of regions, provided in an electromagnetic wave radiation range of the electromagnetic wave generating means, each of the regions reflecting part of the electromagnetic waves at a predetermined reflectance, the predetermined reflectance of at least one of the regions being substantially equal to that of a forgery-preventive document; and electromagnetic wave receiving means provided in the scanning means, for receiving part of the electromagnetic waves reflected by the document or the reflective member; and first processing means for performing a forgery preventive action when a reception level of the part of the electromagnetic waves reflected by the document and received by the electromagnetic wave receiving means falls within a range that is set based on a reflectance of a forgery preventive document.

3. The image forming apparatus according to claim 2, further comprising second processing means for performing a trouble-related action when a reception level of the part of the electromagnetic waves reflected by at least one of the regions of the reflective member and received by the electromagnetic wave receiving means does not fall within a range that has been predetermined as a variation range under a normal condition.

4. A method of scanning a document, comprising the steps of:

(a) generating electromagnetic waves in a scanning means of a reading device;

(b) receiving the reflectance of the electromagnetic waves from different regions of a reflecting member, each of the regions having a predetermined reflectance and at least one of the regions having a reflectance substantially equal to that of a forgery-preventive document;

(c) moving the scanning means along a platen glass to process an image of the document when the reflected electromagnetic waves are within a predetermined range, not indicating a forgery-preventive document.

5. A method according to claim 4, further comprising the step of:

(d) testing the reflectance received from the plurality of regions before beginning to scan the document, to verify that reflectance is received within predetermined normal operating ranges.

6. A method according to claim 5, further comprising the step of:

(e) readjusting the predetermined ranges of normal operation during every pass of the reading device.

7. A method according to claim 4, further comprising the steps of:

(d) detecting the presence of a forgery-preventive document by reflectance within a predetermined range; and (e) repeating the detection of the reflectance of the document at predetermined scan increments, and aborting the copying process when the reflectance remains at the predetermined forgery-preventive range, after a set number of increments.

8. A document reading device comprising:

a platen glass on which a document is to be placed;

scanning means that moves along the platen glass;

microwave generating means provided in the scanning means, for radiating microwaves;

a reflective member provided in a microwave radiation range of the microwave generating means, for reflecting part of the microwaves at a predetermined reflectance, the reflective member being so provided as to reflect the part of the microwaves at a reflectance that is substantially equal to that of a forgery preventive document; and microwave receiving means provided in the scanning means, for receiving part of the microwaves reflected by the document or the reflective member.

9. The document reading device according to claim 8, wherein the reflective member has a plurality of regions having different reflectances.

10. The document reading device according to claim 9, wherein one of the plurality of regions having different reflectances is so provided as to reflect the part of the microwaves at a reflectance that is substantially equal to that of a forgery preventive document.

11. An image forming apparatus comprising:

a document reading device comprising:

a platen glass on which a document is to be placed;

scanning means that moves along the platen glass;

microwave generating means provided in the scanning means, for radiating microwaves;

a reflective member, having a plurality of regions, provided in a microwave radiation range of the microwave generating means, each of the regions reflecting part of the microwaves at a predetermined reflectance, the predetermined reflectance of at least one of the regions being substantially equal to that of a forgery-preventive document; and microwave receiving means provided in the scanning means, for receiving part of the microwaves reflected by the document or the reflective member; and first processing means for performing a forgery preventive action when a reception level of the part of the microwaves reflected by the document and received by the microwave receiving means falls within a range that is set based on a reflectance of a forgery preventive document.

12. The image forming apparatus according to claim 11, further comprising second processing means for performing a trouble-related action when a reception level of the part of the microwaves reflected by the reflective member and received by the microwave receiving means does not fall within a predetermined variation range representing a normal condition.

* * * * *